United States Patent [19]
Barbieri et al.
[11] Patent Number: 4,603,883
[45] Date of Patent: Aug. 5, 1986

[54] PAPER SHEET CARRYING BOARD PROVIDED WITH CLIP AND CLOSABLE SEAT FOR CONTAINING WRITING ARTICLES

[76] Inventors: Raul Barbieri; Giorgio Marianelli, both of Via Faruffini 13, 20149 Milan, Italy

[21] Appl. No.: 731,989

[22] Filed: May 8, 1985

[30] Foreign Application Priority Data

Jun. 28, 1984 [IT] Italy .............................. 22420/84[U]

[51] Int. Cl.[4] .................................................. B32B 3/06

[52] U.S. Cl. ........................................ 281/45; 211/45; 211/50; 428/81; 428/137; 428/192; 248/452; 248/451

[58] Field of Search ................. 428/81, 192, 131, 137; 281/45; 211/45, 50; 248/451, 452

[56] References Cited

U.S. PATENT DOCUMENTS 1,800,362 4/1931 Shipman ................................ 281/45
4,442,780 4/1984 Child ................................ 281/45 X

*Primary Examiner*—Alexander S. Thomas
*Attorney, Agent, or Firm*—Steinberg & Raskin

[57] ABSTRACT

The sheet carrying board comprises a flat surface, a raised edge at least partly surrounding said flat surface, a clip on at least on side portion of said raised edge, and an article-containing seat provided in said raised edge and closable.

12 Claims, 6 Drawing Figures

PAPER SHEET CARRYING BOARD PROVIDED WITH CLIP AND CLOSABLE SEAT FOR CONTAINING WRITING ARTICLES

This patent relates to a sheet carrying board usable as a support for writing in various situations, for example when notes have to be taken and no rigid surface is available on which to rest paper sheets.

In many situations, it is useful to have available a light, portable means of small overall size, which acts as a support for the writing sheet, which retains said sheet in position independently of the extent to which the means is inclined, and which enables the writing instrument to be rested so that it does not roll and to be placed so that it does not fall, whatever position or attitude is assumed by the means.

The board according to the patent constitutes the means able to satisfy the aforesaid requirements, and to this end is characterised essentially by comprising a flat surface surrounded at least partly by a raised edge and containing on at least one side an elastically loaded clip for retaining sheets or the like on said flat surface, said raised edge comprising at least one closable seat for containing articles such as writing instruments.

According to a preferred embodiment of the invention, the board is of plastics construction, and the closable seat is formed from a channel provided in the raised edge and with which a cover is rotatably associated, said channel being provided at its two ends with walls inclined to form a lead-in in order to facilitate extraction of the writing instrument (pen or pencil) contained in the seat.

Further aspects, advantages and advantageous characteristics of the present patent will be apparent on reading the detailed description given hereinafter by way of example, with reference to the accompanying drawing in which.

Figure 1:
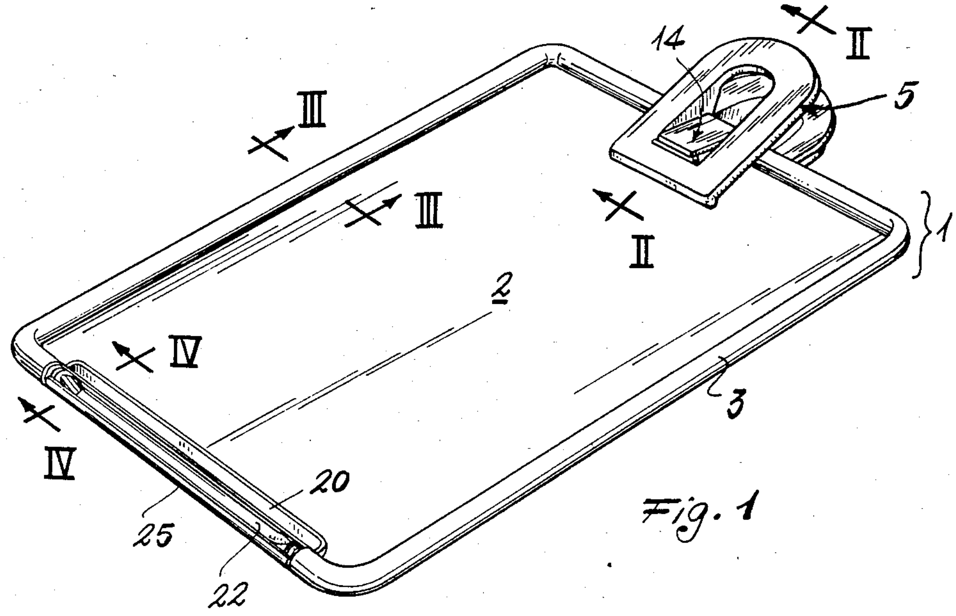
FIG. 1 is an overall perspective view of the board.

With reference to the figures, the board, indicated overall by 1, is of plastics construction and comprises a substantially rectangular flat surface 2 which constitutes the support for the sheets or the like which, for example, are to be written or drawn on, said flat support surface 2 being substantially bounded by a hollow peripheral raised edge 3, of which the outer contour line of the cross-section is approximately in the form of a circular arc extending through more than 180°.

In one of its shorter side portions, the raised edge 3 comprises a depressed central region 4 which is delimited at each end of the step formed by the sudden transition to the depressed region. Said depressed region acts as a fixed rotation pivot for a clip 5, the purpose of which is to retain the paper sheet or sheets or the like on the flat support surface 2 by clamping them against these latter at one of their edges.

The clip 5 has a substantially flat part 6 which surrounds a central aperture 7. On the sides of said aperture 7 there extend downwards two identical parallel sidepieces 8, the distance between their outer walls corresponding approximately to the width of the depression 4 in the raised edge 3. In each of said sidepieces there is a substantially semicircular aperture 9, by which said sidepieces and thus the clip 5 rest on the depressed region 4 of the raised edge 3 so that said clip 5 can be rotated about said depressed region.

On the lower side of one of the ends of the clip 5 there is a projection or rim 10 which acts directly on the sheet or the like resting on the surface 2 so as to keep it clamped against this latter.

A baffle 11 which commences with a groove 12 of arcuate cross-section extends between the two sidepieces 8 and is inclined to the flat part 6 of the clip 5. In this groove there is disposed a rim 13 present at the end of a U-shaped element 14 which acts as a spring and partially embraces the depressed region 4 of the raised edge, and which terminates at its other end in a further rim 15 which lies in a corresponding groove 16 provided in the lower face of the support panel 2.

The depressed region 4 of the raised edge 3 subtends an aperture 17 formed in the region itself.

An eyelet 18 by means of which the board can be hung from a wall is provided at the depressed region 4 and projects outwards.

It should be noted that the inclined baffle 11 is important in that it considerably facilitates the mounting of the spring 14. In this respect, it enables the upper arm of this latter to be guided until the rim 13 snaps into the groove 12.

At the end opposite that comprising the depressed region 4, the flat surface 2 comprises an aperture 20 bounded outwardly by a zone 21 in which the raised edge 3 is of a different configuration such as to form an upwardly open seat 22 in which a writing instrument 24 can be placed, said seat being closable by a rotatable cover 25 in the form of a section bar having a cross-section shaped as a circular arc of greater than 180°, and of elastically deformable plastics construction.

Figure 4:
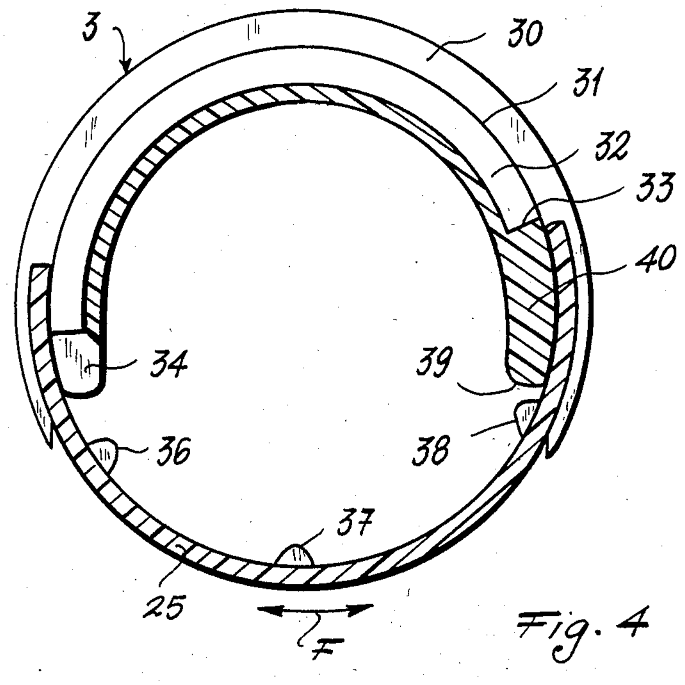
FIG. 4 is a section on the line IV—IV of FIG. 1, said section showing the guide and stop means for the cover which closes the seat for containing a writing instrument, for example a pencil or ball-point pen.

The zone 21 is bounded at both ends by a step 30 and begins with a first downwardly open hollow part 31 of substantially circular-arc profile. This is followed by a groove 32 which, as can be seen in FIG. 4, is interrupted at one end by a wall 33 whereas at its other end it comprises an aperture 34. The ends of the cover 25 adhere elastically to the parts 31, the cover 25 extending over the entire zone 21 and having a cross-section in the form of a circular arc exceeding 180° in extension. The cover 25 is snap-fitted on to the zone 21. At each of the two grooves 32, the cover 25 comprises three spaced-apart inner projections 36, 37, 38 designed to enter the grooves 32. The cover 25 can be manually rotated about the geometrical axis of the parts 31 from one of its limiting positions, in which the projection 38 halts against the end 39 of the solid portion 40 which intersects the grooves 32 and to which the said wall 33 pertains, to its other limiting position in which the projection 36 halts against said wall 33, and vice versa (see arrows F in FIG. 4). The purpose of the aperture 34 is to allow the projections 36, 37, 38 to enter and leave the groove 32.

When the projections 36 are in contact with the stop walls 33, the cover 25 covers the seat 22 in which the pencil or pen 24 is placed, so preventing it from falling, said seat 22 being bounded at its ends by inclined surfaces 40, or rather by a conical surface to facilitate extraction of the pen or pencil 24 by pressing against one of its ends.

Figure 5:
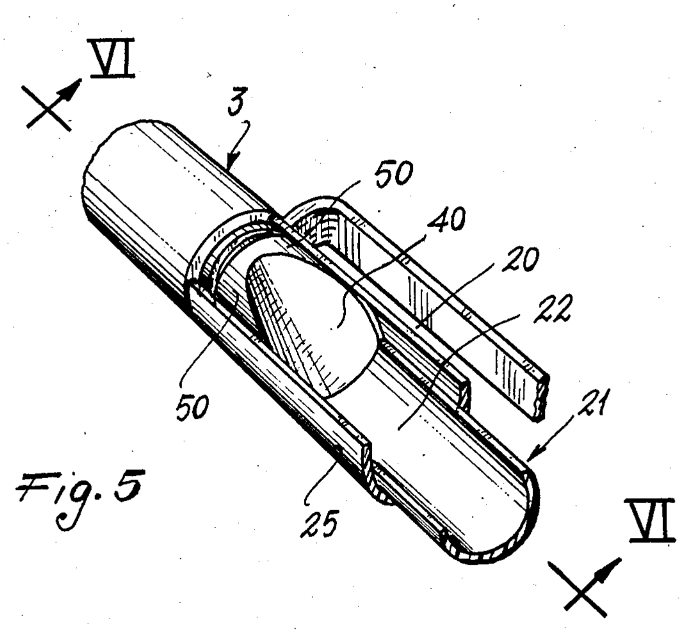
FIG. 5 is a perspective detailed view of the end of the containing seat for the writing instrument.

The zone 21 is bounded laterally by the grooves 32, and is of semi-circular cross-section in that part which lies between the conical surfaces 40 (as can be seen in FIG. 5), whereas in that part comprising said surfaces, said zone 21 is externally bounded by surfaces in the form of a cylindrical sector 50 of diameter equal to the outer diameter of the semicircular section of the seat 22.

The purpose of the aperture 20 is to enable the cover 25 to be rotated.

Figure 3:
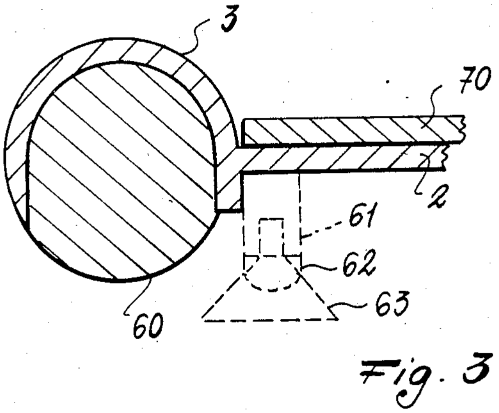
FIG. 3 is a section on the line III—III of FIG. 1.
Figure 2:
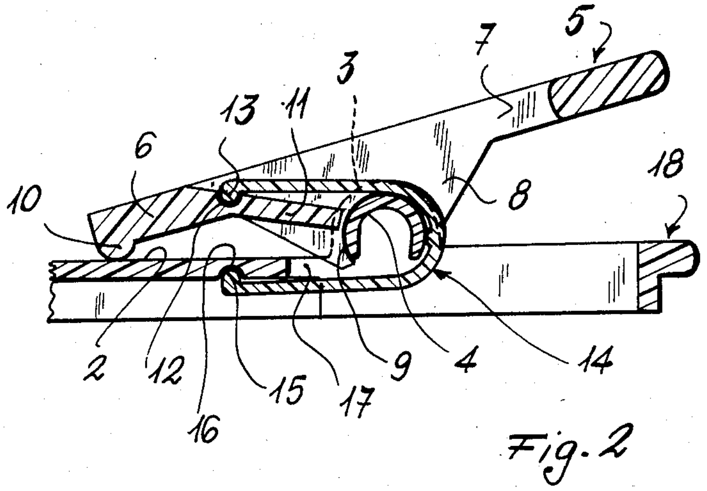
FIG. 2 is a section on the line II—II of FIG. 1.
Figure 6:
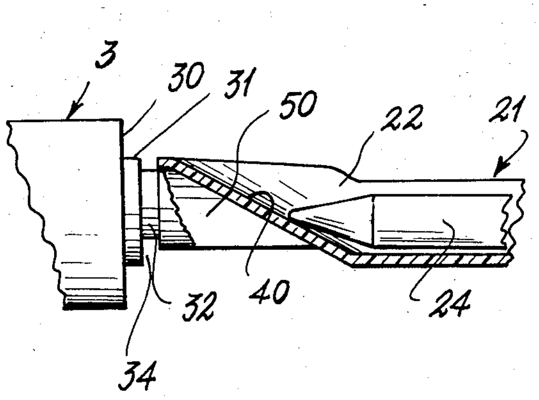
FIG. 6 is a partial section on the line VI—VI of FIG. 5.

A section bar of elastically deformable material 60 can be inserted into the cavity of the raised edge 3 to act as a support for the board. This is to oppose any sliding on smooth surfaces. Alternatively, the lower face of the board can be provided with bored projections 61 (see FIG. 3), in which support feet 62 or suckers 63 can be mounted.

According to the invention, pen holders 22 can be provided at other points of the raised edge 3 comprising the closable seat, and in addition two or more seats can be provided. Furthermore, a removable mat 70 can be rested on the surface 2 to prevent the paper slipping.

What we claim is:

1. A sheet carrying board comprising:

a flat surface;

a raised edge at least partly surrounding said flat surface;

a clip provided on at least one side portion of said raised edge;

an article-containing seat provided in said raised edge and closable.

2. A board as claimed in claim 1, wherein the closable seat is formed from a channel in the raised edge, and with which a rotatable cover is associated.

3. A board as claimed in claim 2, wherein the channel is provided at its ends with inclined walls.

4. A board as claimed in claim 1, wherein to the sides of the closable seat there are provided grooves and at least partly cylindrical support and guide surfaces for the rotatable cover, which is elastically deformable and is substantially of axially-interrupted cylindrical configuration.

5. A board as claimed in claim 4, wherein in a position corresponding with the grooves, the cover comprises projections which define the opening and closure travel of the cover by cooperating with limit stops associated with the grooves.

6. A board as claimed in claim 1, wherein the raised edge is hollow and open lowerly.

7. A board as claimed in claim 6, wherein at least one elastically deformable section bar is mounted in the cavity of the raised edge.

8. A board as claimed in claim 1, which rests on feet.

9. A board as claimed in claim 1, which is associated with suckers.

10. A board as claimed in claim 1, wherein the clip comprises a lever member rotatably supported on a depressed region of the raised edge, and on which one arm of a U spring acts, the other arm of which engages with the flat surface.

11. A board as claimed in claim 10, wherein the lever member comprises an aperture into which there extends an inclined wall to facilitate the mounting of the spring.

12. A board as claimed in claim 1 and also comprising an eyelet, disposed in a position corresponding with the clip.

* * * * *